(12) United States Patent
Yamasaki

(10) Patent No.: US 12,129,391 B2
(45) Date of Patent: Oct. 29, 2024

(54) COMPOSITION FOR SLIDING MEMBER AND SLIDING MEMBER

(71) Applicant: NOK KLUEBER CO., LTD., Tokyo (JP)

(72) Inventor: Yujiro Yamasaki, Ibaraki (JP)

(73) Assignee: NOK KLUEBER CO., LTD., Tokyo (JP)

( * ) Notice: Subject to any disclaimer, the term of this patent is extended or adjusted under 35 U.S.C. 154(b) by 572 days.

(21) Appl. No.: 17/289,855

(22) PCT Filed: Dec. 4, 2019

(86) PCT No.: PCT/JP2019/047383
§ 371 (c)(1),
(2) Date: Apr. 29, 2021

(87) PCT Pub. No.: WO2020/144980
PCT Pub. Date: Jul. 16, 2020

(65) Prior Publication Data
US 2021/0403752 A1    Dec. 30, 2021

(30) Foreign Application Priority Data

Jan. 11, 2019  (JP) ................................ 2019-003589

(51) Int. Cl.
| | |
|---|---|
| *C09D 179/08* | (2006.01) |
| *C08K 3/04* | (2006.01) |
| *C08K 3/30* | (2006.01) |
| *C08L 27/18* | (2006.01) |
| *C09D 7/61* | (2018.01) |
| *C09D 7/65* | (2018.01) |
| *C09D 127/18* | (2006.01) |

(52) U.S. Cl.
CPC ............ *C09D 179/08* (2013.01); *C08K 3/04* (2013.01); *C08K 3/30* (2013.01); *C08L 27/18* (2013.01); *C09D 7/61* (2018.01); *C09D 7/65* (2018.01); *C09D 127/18* (2013.01); *C08K 2003/3009* (2013.01)

(58) Field of Classification Search
CPC ......... C09D 179/08; C09D 7/61; C09D 7/65; C09D 127/18; C08K 3/04; C08K 3/30; C08K 2003/3009; C08L 27/18
See application file for complete search history.

(56) References Cited

U.S. PATENT DOCUMENTS

| | | |
|---|---|---|
| 5,635,299 A | 6/1997 | Tanaka |
| 2017/0211006 A1 | 7/2017 | Yamasaki |

FOREIGN PATENT DOCUMENTS

| | | |
|---|---|---|
| EP | 2048391 A2 | 4/2009 |
| EP | 3 144 144 A1 | 3/2017 |
| GB | 2489571 A | 1/2012 |
| JP | S61-278594 A | 12/1986 |
| JP | H07-189804 A | 7/1995 |
| JP | H8-269371 A | 10/1996 |
| JP | 2003-73609 A | 3/2003 |
| JP | 2007-290358 A | 11/2007 |
| JP | 2012-012480 A | 1/2012 |
| JP | 2017-155201 A | 9/2017 |
| WO | WO 2015/174292 A1 | 11/2015 |
| WO | 2018/110251 A1 | 6/2018 |

OTHER PUBLICATIONS

Machine Translation of Hattori JP 2007290358 A (Year: 2007).*
1st Office Action issued in CN Patent Application No. 201980069268. 1, Jan. 28, 2022, translation.
Office Action issued in KR Patent Application No. 10-2021-7012104, Feb. 3, 2023, translation.
ISR for PCT/JP2019/047383, dated Feb. 10, 2020.
EESR issued in European Patent Application No. 19908731.3, Sep. 27, 2022.
Written Opinion issued in WIPO Patent App. No. PCT/JP2019/047383, Feb. 10, 2020, English translation.
IPRP issued in WIPO Patent App. No. PCT/JP2019/047383, Jun. 16, 2021, English translation.

* cited by examiner

*Primary Examiner* — Callie E Shosho
*Assistant Examiner* — Bethany M Miller
(74) *Attorney, Agent, or Firm* — GREENBLUM & BERNSTEIN, P.L.C.

(57) ABSTRACT

A sliding member includes a substrate, a first coating film layer which is provided on the substrate, and a second coating film layer which is provided on the first coating film layer. The first coating film layer including a coating film including a composition for a sliding member. The composition for a sliding member contains a binder resin, a solid lubricant, and at least one type of resin beads selected from the group consisting of amino resin beads and urethane resin beads. The second coating film layer includes the binder resin and the solid lubricant.

8 Claims, 2 Drawing Sheets ated in the coating film layer around the side far from the sliding member surface is made to be higher than the concentration of the solid lubricant in the coating film layer around the side near the sliding member. Thus, the sliding member with a coating film achieves both enhancement of lubricity of the coating film by addition of a solid lubricant and enhancement of adhesion of the coating film to a base.

SUMMARY OF DISCLOSURE

Technical Problem

On the other hand, as for a sliding member, providing lubricity to a coat by using a solid lubricant and providing adhesion between a coat and a base of the coat are inconsistent with each other, therefore when the lubricity of the coatis attempted to be enhanced, the problem of reduction in adhesion between a coat and a base is caused necessarily. For example, when the ratio of a solid lubricant to be added in the coat is reduced, sufficient lubricity cannot be obtained and thus the coat is not suitable for a sliding member. On the other hand, when the ratio of a solid lubricant to be added in a coat is increased, adhesion between the coat and a base of the coat reduces, and in particular in a high load region, the coat may be easily peeled off from the base.

Therefore, in a sliding member, the amount of a solid lubricant to be added in a coat is optimized according to application to achieve the desired function by balancing adhesion and lubricity, however, there is a limit to achievement of both adhesion and lubricity by optimizing the amount of the solid lubricant to be added. Furthermore, improvement of adhesion by modifying a surface of a sliding member which is a base of a coat by primer treatment etc. has been contemplated, however, even if a base undergoes primer treatment, significant improvement of adhesion cannot be expected.

In the sliding member with a coating film described in International Publication No. 2015/174292, the coating film includes a lower layer provided by spraying a paint having a lower ratio of a solid lubricant to be added on the side near the interface of the coating film and the sliding member which is a base, and an upper layer provided by spraying a paint having a higher ratio of a solid lubricant on the lower layer by wet on wet coating without drying the lower layer. Thus, in the sliding member with a coating film described in International Publication No. 2015/174292, a gradient coating in which the concentration of the solid lubricant is inclined is used as a coating film to achieve both adhesion and lubricity.

On the other hand, a sliding member with a coating film in recent years has been required to have sufficient adhesion even when being subjected to a sliding condition of higher load. In some sliding conditions, when adhesion between a coating film and a surface of a sliding member is insufficient, the coating film may peel off at an interface of the sliding member and the coating film. Therefore, a composition for a sliding member and a sliding member which can prevent a coating film from peeling off around an interface of a substrate and the coating film and which can maintain lubricating function over a long term are actually required.

The present disclosure was developed considering these facts, and an object of the present disclosure is to provide a composition for a sliding member and a sliding member which can prevent a coating film from peeling off around an interface of the coating film and an object to be coated and which can maintain lubricating function over a long term.

Solution to Problem

The composition for a sliding member according to the present disclosure contains a binder resin, a solid lubricant, and at least one type of resin beads selected from the group consisting of amino resin beads and urethane resin beads.

According to the composition for a sliding member of the present disclosure, since a coating film of the composition for a sliding member contains resin beads, the adhesion strength of an interface of a binder resin and resin beads is lower relative to the adhesion strength of an interface of the binder resin and a substrate which is an object to be coated with the composition for a sliding member. Thus, even when the sliding member slides while a load is applied to the coating film of the composition for a sliding member, it is expected that a break starting point of the coating film does not exist at an interface of the coating film and the substrate which is an object to be coated but exists at an interface of the binder resin and the resin beads. In this case, breaking of the coating film at the interface of the binder resin and the resin beads occurs inside the coating film, and thus breaking of the coating film at the interface of the coating film and the substrate which is an object to be coated with the coating film is suppressed, and peeling of the coating film of the composition for a sliding member from the substrate can be suppressed. Thus, the composition for a sliding member can prevent peeling of the coating film due to breaking of the coating film at the interface of the substrate and the obtained coating film while maintaining lubricating function based on a solid lubricant. As a result, the composition for a sliding member can be provided which can prevent a coating film from peeling off around an interface of the coating film and an object to be coated and which can maintain lubricating function over a long term.

In the above composition for a sliding member, the resin beads preferably include amino resin beads and urethane resin beads. By providing this constitution, the resin beads contain both amino resin beads and urethane resin beads, and thus breaking of the coating film at the interface of the binder resin and the resin beads is more likely to occur inside the coating film. Therefore, peeling of the coating film due to breaking of the coating film at the interface of the substrate and the coating film can be prevented more efficiently while maintaining lubricating function based on a solid lubricant.

In the above composition for a sliding member, the amino resin beads preferably includes at least one amino resin selected from the group consisting of a urea resin, a melamine resin, an aniline resin and a guanamine resin. By providing this constitution, when the sliding member slides while a load is applied to the coating film of the composition for the sliding member, the coating film at an interface between the binder resin and the amino resin beads containing these amino resins is broken moderately depending on the load, and thus peeling of the coating film around an interface of the coating film and the object to be coated can be prevented more securely.

In the above composition for a sliding member, the amino resin preferably includes at least one condensation product selected from the group consisting of a benzoguanamine-formaldehyde condensation product, a benzoguanamine-melamine-formaldehyde condensation product and a melamine-formaldehyde condensation product. By providing this constitution, when the sliding member slides while a load is applied to the coating film of the composition for the sliding member, the coating film at an interface between the binder resin and the amino resin beads containing these amino resins is broken moderately depending on the load, and thus peeling of the coating film around an interface of the coating film and the object to be coated can be prevented more securely.

In the above composition for a sliding member, the average particle size of the resin beads is preferably 0.1 µm to 20 µm. By providing this constitution, the size of the resin beads is within a suitable range in the composition for a sliding member, and thus, when the sliding member slides while a load is applied to the coating film of the composition for the sliding member, the coating film at an interface between the binder resin and the resin beads is broken moderately depending on the load. Therefore, peeling of the coating film around an interface of the coating film and the object to be coated can be prevented more securely, which enables maintaining of lubricating function over a long term.

In the above composition for a sliding member, the amount of the resin beads to be added is preferably 1 mass % to 35 mass % based on the total mass of the composition for a sliding member. By providing this constitution, the content of the resin beads in the coating film is within a suitable range in the composition for a sliding member, and thus, when the sliding member slides while a load is applied to the coating film of the composition for the sliding member, the coating film at an interface between the binder resin and the resin beads containing the above amino resin is broken moderately depending on the load. Therefore, peeling of the coating film around an interface of the coating film and the object to be coated can be prevented, which enables maintaining of lubricating function over a long term.

In the above composition for a sliding member, the binder resin preferably includes at least one resin selected from the group consisting of a polyamideimide resin, a polyamide resin, a polyimide resin, an epoxy resin and a phenol resin. By providing this constitution, adhesion between the substrate which is an object to be coated and the coating film of the composition for a sliding member enhances, and thus peeling of the coating film around an interface of the coating film and the object to be coated can be prevented more securely, which enables maintaining of lubricating function over a long term.

In the above composition for a sliding member, the solid lubricant preferably includes at least one lubricant selected from the group consisting of polytetrafluoroethylene, graphite and molybdenum disulfide. By providing this constitution, lubricating function of the coating film of the composition for a sliding member enhances, which enables maintaining of lubricating function over a much longer term.

The sliding member according to the present disclosure includes a substrate and a first coating film layer of the above composition for a sliding member wherein the first coating film layer is provided on the substrate.

According to the sliding member of the present disclosure, since the coating film of the composition for a sliding member contains resin beads, the adhesion strength of an interface of the binder resin and the resin beads is lower relative to the adhesion strength of an interface of the binder resin and the substrate which is an object to be coated with the composition for a sliding member. Thus, even when the sliding member slides while a load is applied to the first coating film layer, it is expected that a break starting point of the first coating film layer does not exist at an interface of the first coating film layer and the substrate which is an object to be coated but exists at an interface of the binder resin and the resin beads. In this case, breaking of the first coating film layer at the interface of the binder resin and the resin beads occurs inside the first coating film layer, and thus breaking of the first coating film layer at the interface of the first coating film layer and the substrate which is an object to be coated with the composition for a sliding member is suppressed, and peeling of the first coating film layer from the substrate can be suppressed. Thus, the sliding member can prevent peeling of the first coating film layer due to breaking of the first coating film layer at the interface of the substrate and the first coating film layer while maintaining lubricating function based on the solid lubricant. As a result, the sliding member can be provided which can prevent the coating film from peeling off around the interface of the first coating film layer and the object to be coated and which can maintain lubricating function over a long term.

The sliding member according to the present disclosure preferably further includes the second coating film layer including a binder resin and a solid lubricant wherein the second coating film layer is provided on the first coating film layer. By providing this constitution, the sliding member contains the resin beads in the first coating film layer, and thus the adhesion strength between the binder resin in the first coating film layer and the resin beads is lower relative to the adhesion strength between the first coating film layer and the substrate. Therefore, even when the sliding member slides with another member while the second coating film layer contacts with the other member, the first coating film layer is broken between the binder resin and the resin beads inside the first coating film layer. As a result, breaking of the first coating film layer at an interface between the first coating film layer and the substrate, and at an interface of the second coating film layer and the first coating film layer can be prevented. As a result, peeling of the first coating film layer from the substrate can be prevented, which enables achievement of the sliding member which can maintain lubricating function over a long term.

Effects of Invention

According to the present disclosure, the composition for a sliding member and a sliding member can be achieved which can prevent a coating film from peeling off around an interface of the coating film and an object to be coated, and which can maintain lubricating function over a long term.

DESCRIPTION OF EMBODIMENTS

Figure 1:
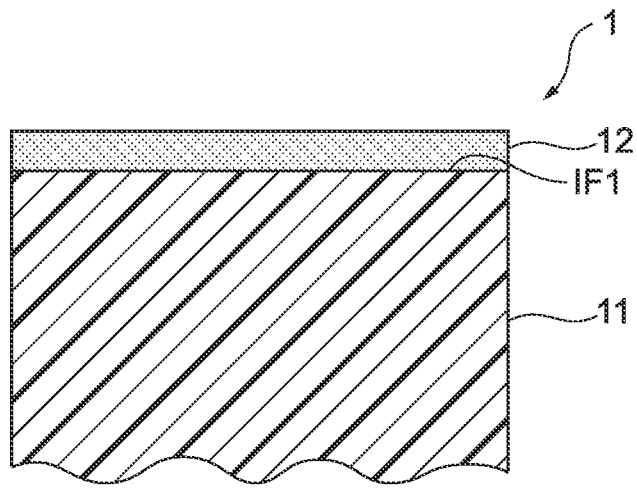
FIG. 1 A schematic cross-sectional view showing an example of the sliding member according to the embodiment of the present disclosure.

Hereinafter, embodiments of the present disclosure will be described in detail by reference to the appended drawings. The composition for a sliding member according to the present disclosure contains a binder resin, a solid lubricant and resin beads including at least one resin selected from the group consisting of amino resin beads and urethane resin beads. Hereinafter, each constituting element of the composition for a sliding member will be described in detail.

<Binder Resin>

A binder resin binds a solid lubricant and resin beads. A binder resin is not particularly limited as long as the binder resin can bind a solid lubricant and resin beads. These binder resins may be used alone or in combination of two or more.

Among these, the binder resin preferably includes at least one amino resin selected from the group consisting of a polyamideimide resin (PAI), a polyamide resin (PA), a polyimide resin (PI), an epoxy resin and a phenol resin, and more preferably includes a polyamideimide resin, from the viewpoint of enhancement of adhesion of a substrate which is an object to be coated and a coating film, ability to prevent a coating film from peeling off around an interface of the coating film and the object to be coated, and ability to maintain lubrication function over a long term.

As a binder resin, for example, commercially available products may be used such as the one having product name: HPC-5012 (polyamideimide resin, manufactured by Hitachi Chemical Company, Ltd.).

From the viewpoint of achieving both adhesion to the surface of the sliding member as a substrate and lubricity of the sliding member, the amount of the binder resin to be added is preferably 30 mass % or more, more preferably 45 mass % or more, and further preferably 50 mass % or more, and preferably 80 mass % or less, more preferably 70 mass % or less, and further preferably 65 mass % or less based on the total mass of the composition for a sliding member. Considering the above, the amount of the binder resin to be added is preferably 30 mass % to 80 mass %, more preferably 45 mass % to 70 mass %, and further preferably 50 mass % to 65 mass % based on the total mass of the composition for a sliding member.

<Solid Lubricant>

A solid lubricant provides lubricity to the coat of the composition for a sliding member. A solid lubricant is not particularly limited as long as the solid lubricant can provide lubricity to the composition for a sliding member. As solid lubricants, for example, polytetrafluoroethylene (PTFE), a tetrafluoroethylene-perfluoroalkylvinylether copolymer, a tetrafluoroethylene-hexafluoropropylene copolymer, a tetrafluoroethylene-ethylene copolymer, a fluorine-based polymer selected from the group consisting of polyvinylidene fluoride, trichlorotrifluoroethylene etc., metal disulfides such as molybdenum disulfide and tungsten disulfide, graphite can be exemplified. These solid lubricants may be used alone or in combination of two or more.

Among these, the solid lubricant preferably includes at least one lubricant selected from the group consisting of a fluorine-based polymer, metal disulfide and graphite, more preferably includes at least one lubricant selected from the group consisting of polytetrafluoroethylene, molybdenum disulfide and graphite, and further preferably polytetrafluoroethylene and graphite are used in combination, from the viewpoint of enhancement of lubricating function of the coating film of the sliding member, ability to prevent the coating film from peeling off around an interface of the coating film and the object to be coated, and ability to maintain lubrication function over a much longer term.

As a solid lubricant, commercially available products may be used such as those having product name: Fluon® L173J (polytetrafluoroethylene, AGC Inc.) and product name: HOP (graphite, manufactured by Nippon Graphite Industries, Co., Ltd.).

The amount of the solid lubricant to be added is preferably 5 mass % or more, more preferably 15 mass % or more, and further preferably 25 mass % or more based on the total mass of the composition for a sliding member from the viewpoint that the composition can be suitably used as the coat of the sliding member by enhancing adhesion without reducing lubricity, and preferably 50 mass % or less, more preferably 45 mass % or less, and further preferably 35 mass % or less from the viewpoint that the composition can be suitably used as the coat of the sliding member by enhancing lubricity without reducing adhesion. Considering the above, the amount of the solid lubricant to be added is preferably 5 mass % to 50 mass %, more preferably 15 mass % to 45 mass %, and further preferably 25 mass % to 35 mass % based on the total mass of the composition for a sliding member from the viewpoint of achieving both adhesion to the surface of the sliding member as a substrate and lubricity of the sliding member.

Furthermore, the amount of the solid lubricant to be added based on the binder resin is preferably 30 parts by mass or more, more preferably 35 parts by mass or more, and further preferably 40 parts by mass or more based on 100 parts by mass of the binder resin from the viewpoint that the composition can be suitably used as the coat of the sliding member by enhancing adhesion without reducing lubricity, and preferably 80 parts by mass or less, more preferably 75 parts by mass or less, and further preferably 70 parts by mass or less from the viewpoint that the composition can be suitably used as the coat of the sliding member by enhancing lubricity without reducing adhesion. Considering the above, the amount of the solid lubricant to be added is preferably 30 parts by mass to 80 parts by mass, more preferably 35 parts by mass to 75 parts by mass, and further preferably 40 parts by mass to 70 parts by mass based on 100 parts by mass of the binder from the viewpoint of achieving both adhesion to the surface of the sliding member as a substrate and lubricity of the sliding member.

<Resin Beads>

As resin beads, at least one type of resin beads selected from the group consisting of amino resin beads and urethane resin beads is used. When amino resin beads are used as the resin beads, the adhesion strength between the binder resin and the amino resin beads inside the coating film is lower relative to the adhesion strength between the binder resin and the substrate which is an object to be coated. Therefore, when the sliding member slides, the coating film is broken at an interface of the binder resin and the amino resin beads inside the coating film, breaking of the coating film at an interface of the coating film and the substrate can be suppressed, and thus peeling of the coating film from the substrate can be suppressed. In addition, when urethane resin beads are used as the resin beads, the adhesion strength between the binder resin and the urethane resin beads is lower relative to the adhesion strength between the binder resin and the substrate which is an object to be coated. Therefore, when the sliding member slides, the coating film is broken at an interface of the binder resin and the urethane resin beads inside the coating film, breaking of the coating film at an interface of the coating film and the substrate can be suppressed, and thus peeling of the coating film from the substrate can be suppressed. In addition, since the urethane resin beads can provide softness to the coating film, the surface pressure applied to the coating film during sliding of the sliding member can be reduced. Therefore, local stress can be prevented from being applied to the coating film, and thus early breaking and abrasion of the coating film can be also suppressed.

As an amino resin includes in amino resin beads, for example, a benzoguanamine-formaldehyde condensation product, a benzoguanamine-melamine-formaldehyde condensation product, a melamine-formaldehyde condensation product, a methylated melamine resin, a melamine resin, a urea resin, a urea-melamine resin, a urea-formaldehyde resin, an aniline resin and a guanamine resin can be exemplified. The amino resin included in the amino resin beads may consist of one or two or more amino resins. Among these, at least one amino resin selected from the group consisting of a urea resin, a melamine resin, an aniline resin and a guanamine resin is preferable, and at least one condensation product selected from the group consisting of a benzoguanamine-formaldehyde condensation product, a benzoguanamine-melamine-formaldehyde condensation product and a melamine-formaldehyde condensation product is more preferable, from the viewpoint of effective prevention of peeling at an interface of the sliding member as a substrate of the coating film and the coating film.

Furthermore, as resin beads, it is preferable to use amino resin beads and urethane resin beads in combination from the viewpoint of more effective prevention of peeling at an interface of the sliding member as a substrate of the coating film and the coating film.

The average particle size of amino resin beads is preferably 0.1 μm or more, more preferably 0.125 μm or more, and further preferably 0.15 μm or more and preferably 20 μm or less, more preferably 15 μm or less, further preferably 12.5 μm or less, and still further preferably 10 μm or less from the viewpoint of prevention of peeling at an interface of the sliding member as a substrate of the coating film and the coating film.

Urethane resin beads are resin in the form of beads obtained by, for example, reacting polyol and polyisocyanate. The average particle size of the urethane resin beads is preferably 2 μm or more, more preferably 2.5 μm or more, and further preferably 5 μm or more, from the viewpoint of prevention of peeling at an interface between the sliding member as a substrate of the coating film and the coating film, and more preferably 20 μm or less, further preferably 15 μm or less, and still further preferably 10 μm or less.

Considering the above, the average particle size of the resin beads is preferably 0.1 μm or more, more preferably 0.155 μm or more, and further preferably 0.2 μm or more from the viewpoint of prevention of peeling at an interface of the sliding member as a substrate of the coating film and the coating film, and preferably 20 μm or less, more preferably 15 μm or less, and further preferably 10 μm or less. The average particle size of the resin beads described above is measured by a measurement method according to a laser diffraction scattering method.

The amount of the amino resin beads to be added is preferably 3 mass % or more, more preferably 4 mass % or more, and further preferably 5 mass % or more based on the total mass of the composition for a sliding member from the viewpoint of prevention of peeling at an interface of the sliding member as a substrate of the coating film and the coating film, and preferably 20 mass % or less, more preferably 17.5 mass % or less, and further preferably 15 mass % or less.

Furthermore, the amount of the amino resin beads to be added based on the binder resin is preferably 5 parts by mass or more, more preferably 7.5 parts by mass or more, and further preferably 10 parts by mass or more based on 100 parts by mass of the binder resin from the viewpoint of prevention of peeling at an interface of the sliding member as a substrate of the coating film and the coating film, and preferably 40 parts by mass or less, more preferably 35 parts by mass or less, and further preferably 30 parts by mass or less.

The amount of the urethane resin beads to be added is preferably 1 mass % or more, more preferably 3 mass % or more, and further preferably 4 mass % or more based on the total mass of the composition for a sliding member from the viewpoint of prevention of peeling at an interface of the sliding member as a substrate of the coating film and the coating film, and preferably 15 mass % or less, more preferably 13 mass % or less, and further preferably 12 mass % or less.

Furthermore, the amount of the urethane resin beads to be added based on the binder resin is preferably 2.5 parts by mass or more, more preferably 5 parts by mass or more, and further preferably 7 parts by mass or more based on 100 parts by mass of the binder resin from the viewpoint of prevention of peeling at an interface of the sliding member as a substrate of the coating film and the coating film, and preferably 30 parts by mass or less, more preferably 25 parts by mass or less, and further preferably 20 parts by mass or less.

The amount of the resin beads to be added when amino resin beads and urethane resin beads are used in combination is preferably 1 mass % or more, more preferably 3 mass % or more, and further preferably 4 mass % or more based on the total mass of the composition for a sliding member from the viewpoint of prevention of peeling at an interface of the sliding member as a substrate of the coating film and the coating film, and preferably 35 mass % or less, more preferably 32 mass % or less, and further preferably 30 mass % or less.

Furthermore, the amount of the resin beads to be added based on the binder resin when amino resin beads and urethane resin beads are used in combination is preferably 5 parts by mass or more, more preferably 7.5 parts by mass or more, and further preferably 10 parts by mass or more based on 100 parts by mass of the binder resin from the viewpoint of prevention of peeling at an interface of the sliding member as a substrate of the coating film and the coating film, and preferably 65 parts by mass or less, more preferably 60 parts by mass or less, and further preferably 55 parts by mass or less.

Considering the above, the amount of the resin beads to be added is preferably 1 mass % or more, more preferably 3 mass % or more, and further preferably 4 mass % or more based on the total mass of the composition for a sliding member from the viewpoint of prevention of peeling at an interface of the sliding member as a substrate of the coating film and the coating film, and preferably 35 mass % or less, more preferably 32 mass % or less, and further preferably 30 mass % or less. Furthermore, the amount of the urethane resin beads to be added based on the binder resin is preferably 2.5 parts by mass or more, more preferably 5 parts by mass or more, and further preferably 7 parts by mass or more based on 100 parts by mass of the binder resin from the viewpoint of prevention of peeling at an interface of the sliding member as a substrate of the coating film and the coating film, and preferably 65 parts by mass or less, more preferably 60 parts by mass or less, and further preferably 55 parts by mass or less.

In the composition for a sliding member according to the present embodiment, other materials may be added within a range for exhibiting the effects of the present disclosure. As other materials, for example, a conventionally known colored filler, surfactant and defoaming agent can be exemplified. These other materials may be used alone or in combination of two or more. Furthermore, the composition for a sliding member may contain a solvent for adjusting viscosity depending a method of coating an object to be coated such as a sliding member.

<Manufacturing Method of Composition for a Sliding Member>

A manufacturing method of the composition for a sliding member is not particularly limited as long as a binder, a solid lubricant, resin beads as fillers, and other materials and solvents if needed, can be mixed and dispersed by using the method. The composition for a sliding member can be manufactured by dispersing and mixing, for example, a solid lubricant, resin beads, and other materials and solvents if needed, by using a stirrer such as a dissolver; a ball mill, a sand mill, an agihomomixer etc. appropriately in combination.

An application method of the composition for a sliding member to an object to be coated such as a sliding member is not particularly limited as long as the composition for a sliding member can be applied to an object to be coated by using the method. As an application method of the composition for a sliding member, a spraying method, a dipping method, a roll coating method, a dispenser method can be exemplified.

When the composition for a sliding member is manufactured and when the composition for a sliding member is applied to an object to be coated, a solvent may be added to the composition for a sliding member if needed to adjust viscosity. A solvent is not particularly limited as long as the solvent can adjust the viscosity of the composition for a sliding member to a desired viscosity. As a solvent, for example, N-methyl-2-pyrrolidone, N,N-dimethylformamide, xylene, methyl ethyl ketone and methyl isobutyl ketone can be exemplified. These solvents may be used alone or in combination of two or more. Among these, N-methyl-2-pyrrolidone and methyl isobutyl ketone are preferable as solvents.

<Manufacturing Method of Coating Film>

The composition for a sliding member according to the above embodiment is diluted by a solvent if needed and applied to an object to be coated, then while the solvent contained in the composition for a sliding member are evaporated by a drying process and a baking process, the resin is cross-linked, and thus a coating film (baked film) can be manufactured. As a substrate which is an object to be coated with the composition for a sliding member, for example, a resin member and a metal member can be exemplified. The drying temperature in the drying process is appropriately determined depending on the resin included in the composition for a sliding member. The drying temperature in the drying process is, for example, 60° C. to 120° C. In this case, the composition for a sliding member is applied so that the film thickness after the drying process of, for example, 15 μm to 100 μm is obtained. The baking temperature in the baking process is appropriately determined depending on the resin included in the composition for a sliding member similarly to the drying process. The baking temperature in the baking process is, for example, 150° C. to 300° C. In this case, the composition for a sliding member is applied so that the film thickness after the drying process of, for example, 10 μm to 80 μm is obtained. The coating film of the composition for a sliding member after the baking process (baked film) is cooled, then polished for adjusting if needed, to obtain a product.

As described above, in the composition for a sliding member according to the above embodiment, the coating film of the composition for a sliding member contains resin beads, and thus the adhesion strength of an interface of the binder resin and the resin beads is lower relative to the adhesion strength of an interface of the binder resin and a substrate which is an object to be coated with the composition for a sliding member. Thus, even when the sliding member slides while a load is applied to the coating film of the composition for a sliding member, it is expected that a break starting point of the coating film does not exist at an interface of the coating film and the substrate which is an object to be coated but exists at an interface of the binder resin and the resin beads. In this case, breaking of the coating film at the interface of the binder resin and the resin beads occurs inside the coating film, and thus breaking of the coating film at the interface of the coating film and the substrate which is an object to be coated with the coating film is suppressed, and peeling of the coating film of the composition for a sliding member from the substrate can be suppressed. Thus, the composition for a sliding member can prevent peeling of the coating film due to breaking of the coating film at the interface of the substrate and the obtained coating film while maintaining lubricating function based on the solid lubricant. As a result, the composition for a sliding member can be achieved which can prevent the coating film from peeling off around an interface of the coating film and an object to be coated and which can maintain lubricating function over a long term.

<Sliding Member>

Next, the sliding member according to the present embodiment will be described. The sliding member according to the present embodiment included the coating film including the composition for a sliding member according to the above embodiment. FIG. 1 is a schematic cross-sectional view showing an example of the sliding member according to the present embodiment. As shown in FIG. 1, a sliding member 1 includes substrate 11 which is an object to be coated with the composition for a sliding member, and a coating film layer 12 provided on the substrate 11. The substrate 11 is not particularly limited as long as the composition for a sliding member can be applied to the substrate 11, and for example, various resin members, various metal members and the like are used as the substrate 11. The coating film layer 12 is provided by applying the composition for a sliding member according to the above embodiment to the substrate 11 and then drying and baking the composition.

According to the sliding member 1, since the resin beads are contained in the coating film layer 12, adhesion strength between the binder resin and the resin beads in the coating film layer 12 is lower relative to the adhesion strength between the coating film layer 12 and the substrate 11. Thus, even when the sliding member 1 slides with another member while the coating film layer 12 contacts with the other member, the coating film is broken at an interface between the binder resin and the resin beads inside the coating film layer 12, breaking of the coating film at the interface IF1 between the coating film layer 12 and the substrate 11 can be prevented. As a result, peeling of the coating film layer 12 from the substrate 11 can be prevented, which enables achievement of the sliding member which can maintain lubricating function over a long term.

Figure 2:
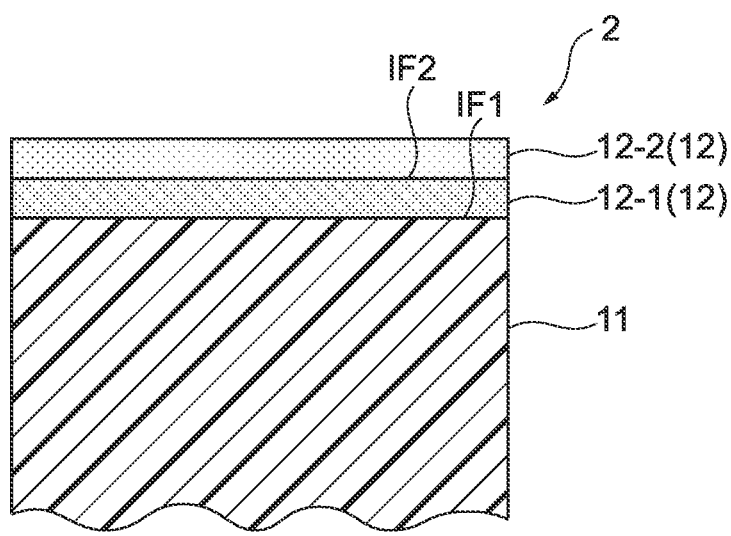
FIG. 2 A schematic cross-sectional view showing another example of the sliding member according to the embodiment of the present disclosure.

FIG. 2 is a schematic cross-sectional view showing another example of the sliding member according to the present embodiment. As shown in FIG. 2, the sliding member 2 includes substrate 11, first coating film layer 12-1 provided on the substrate 11, and second coating film layer 12-2 provided on the first coating film layer 12-1. The first coating film layer 12-1 is provided by applying the above composition for a sliding member to the substrate 11 similarly to the coating film layer 12 shown in FIG. 1. The second coating film layer 12-2 is provided by applying a composition in which a binder resin and a solid lubricant are dispersed in a solvent. As a binder resin, solid lubricant and solvent, a similar binder resin, solid lubricant and solvent to those for the above composition for a sliding member are used. Specifically, in the sliding member 2, the first coating film layer 12-1 as the coating film layer 12 shown in FIG. 1 is covered with the second coating film layer 12-2 provided using the composition for the second coating film layer not containing any resin beads. The amount of the binder resin, solid lubricant and solvent to be added in the composition for the second coating film layer can be, for example, within the similar ranges to those for the above-mentioned composition for a sliding member.

According to the sliding member 2, since the resin beads are contained in the first coating film layer 12-1, adhesion strength between the binder resin and the resin beads in the first coating film layer 12-1 is lower relative to the adhesion strength between the first coating film layer 12-1 and the substrate 11. Thus, even when the sliding member 2 slides with another member while the second coating film layer 12-2 contacts with the other member, the first coating film layer 12-1 is broken at an interface between the binder resin and the resin beads inside the first coating film layer 12-1. As a result, breaking of the first coating film layer 12-1 at the interface IF1 between the first coating film layer 12-1 and the substrate 11 and at the interface IF2 between the second coating film layer 12-2 and the first coating film layer 12-1 can be prevented. As a result, peeling of the coating film layer 12 from the substrate 11 can be prevented, which enables achievement of the sliding member which can maintain lubricating function over a long term.

In manufacturing of the sliding member 2, the first coating film layer 12-1 may be provided by applying the above composition for a sliding member (coating material) to the substrate 11, then the composition of the second coating film layer 12-2 (coating material) is provided on the first coating film layer 12-1 without drying the first coating film layer 12-1. In this case, the first coating film layer 12-1 is applied to the substrate 11 so that the film thickness after baking of, for example, 10 μm to 15 μm is obtained. In addition, the second coating film layer 12-2 is applied to the first coating film layer 12-1 so that the film thickness after baking of, for example, 10 μm to 15 μm is obtained. Furthermore, for example, the total film thickness may be 20 μm to 30 μm. In the sliding member 2, the first coating film layer 12-1 and the second coating film layer 12-2 are provided so that the total film thickness of the first coating film layer 12-1 and the second coating film layer 12-2 of, for example, 20 μm to 30 μm is obtained.

EXAMPLES

Hereinafter, the present disclosure will be described in more detail with reference to the examples conducted for clarifying the effects of the present disclosure. The present disclosure is not limited by the following examples by any means.

The composition for a sliding member according to the above embodiment was prepared to produce the sliding member 2 shown in FIG. 2, and the produced sliding member 2 was subjected to friction abrasion tests and evaluated. Hereinafter, the results will be described.

Example 1

(Preparation of Composition for a Sliding Member)

As a binder resin, a polyamideimide (PAI) resin (product name: "HPC-5012") manufactured by Hitachi Chemical Company, Ltd. was used. As a solid lubricant, polytetrafluoroethylene (PTFE) (product name: "Fluon® L173J, manufactured by AGC Inc.") and graphite (product name: "HOP", manufactured by Nippon Graphite Industries, Co., Ltd.) were used, and as resin beads, amino resin beads (melamine-formaldehyde condensation product, average particle size: 0.2 μm, product name: "EPOSTAR® 5", manufactured by NIPPON SHOKUBAI CO., LTD.) were used. As a solvent, a mixed solvent of N-methyl-2-pyrrolidone and methyl isobutyl ketone was used.

56 parts by mass of the polyamideimide resin, 28 parts by mass of polytetrafluoroethylene, 2 parts by mass of graphite and 14 parts by mass of amino resin beads were sufficiently mixed and dispersed by a ball mill to prepare the coating material of the composition for a sliding member as the composition for a lower layer (composition for the first coating film layer).

(Preparation of Composition for Second Coating Film Layer)

As a binder resin, a polyamideimide (PAI) resin (product name: "HPC-5012") manufactured by Hitachi Chemical Company, Ltd. was used. As a solid lubricant, polytetrafluoroethylene (PTFE) (product name: "Fluon® L173J, manufactured by AGC Inc.") and graphite (product name: "HOP", manufactured by Nippon Graphite Industries, Co., Ltd.) were used. As a solvent, a mixed solvent of N-methyl-2-pyrrolidone and methyl isobutyl ketone was used.

50 parts by mass of the polyamideimide resin, 35 parts by mass of polytetrafluoroethylene and 15 parts by mass of graphite were sufficiently mixed and dispersed by a ball mill to prepare the coating material of the composition for the second coating film layer.

(Preparation of Test Pieces)

The coating material of the composition for the first coating film layer was applied to a test piece (material: stainless (SUS430)) of the sliding member by spraying so that the film thickness after baking of 10 μm to 15 μm was obtained to provide the first coating film layer 12-1 on the test piece. Thereafter, the composition of the second coating film layer was applied without drying the composition for a sliding member so that the film thickness after baking of 10

μm to 15 μm was obtained to provide the second coating film layer 12-2 on the first coating film layer 12-1. The test piece after application was dried at 80° C. for 30 minutes, then baked at 230° C. for 30 minutes. In this case, application was conducted so that the total film thickness of the first coating film layer 12-1 and the second coating film layer 12-2 after baking of 20 μm to 30 μm is obtained to produce the sliding member 2 for testing. The produced sliding member 2 for testing was evaluated according to the following testing method. As a result, the abrasion depth was 1.7 μm, the peeled volume was 0.04 mm$^3$, and the appearance after testing was good. The composition of the first coating film layer 12-1 and the second coating film layer 12-2, and evaluation results are shown in Table 1 below.

Example 2

The sliding member 2 for testing was produced and evaluated similarly to Example 1 except that in the composition for the first coating film layer, 14 parts by mass of amino resin beads (benzoguanamine-melamine-formaldehyde condensation product, average particle size: 3 μm, product name: "EPOSTAR® M30", manufactured by NIPPON SHOKUBAI CO., LTD.) was used instead of 14 parts by mass of amino resin beads (melamine-formaldehyde condensation product, average particle size: 0.2 μm, product name: "EPOSTAR® S", manufactured by NIPPON SHOKUBAI CO., LTD.). As a result, the abrasion depth was 2.0 μm, the peeled volume was 0.01 mm$^3$, and the appearance after testing was good. The evaluation results are shown in Table 1 below.

Example 3

The sliding member 2 for testing was produced and evaluated similarly to Example 1 except that in the composition for the first coating film layer, 63 parts by mass of polyamideimide resin was used and that 7 parts by mass of amino resin beads (benzoguanamine-melamine-formaldehyde condensation product, average particle size: 3 μm, product name: "EPOSTAR® M30", manufactured by NIPPON SHOKUBAI CO., LTD.) was used instead of 14 parts by mass of amino resin beads (melamine-formaldehyde condensation product, average particle size: 0.2 μm, product name: "EPOSTAR® 5", manufactured by NIPPON SHOKUBAI CO., LTD.). As a result, the abrasion depth was 2.2 μm, the peeled volume was 0.02 mm$^3$, and the appearance after testing was good. The evaluation results are shown in Table 1 below.

Example 4

The sliding member 2 for testing was produced and evaluated similarly to Example 1 except that in the composition for the first coating film layer, 14 parts by mass of amino resin beads (benzoguanamine-formaldehyde condensation product, average particle size: 5 μm, product name: "EPOSTAR® M05", manufactured by NIPPON SHOKUBAI CO., LTD.) was used instead of 14 parts by mass of amino resin beads (melamine-formaldehyde condensation product, average particle size: 0.2 μm, product name: "EPOSTAR® S", manufactured by NIPPON SHOKUBAI CO., LTD.). As a result, the abrasion depth was 1.3 μm, the peeled volume was 0.11 mm$^3$, and the appearance after testing was good. The evaluation results are shown in Table 1 below.

Example 5

The sliding member 2 for testing was produced and evaluated similarly to Example 1 except that in the composition for the first coating film layer, 14 parts by mass of amino resin beads (benzoguanamine-formaldehyde condensation product, average particle size: 9 μm, product name: "EPOSTAR® L15", manufactured by NIPPON SHOKUBAI CO., LTD.) was used instead of 14 parts by mass of amino resin beads (melamine-formaldehyde condensation product, average particle size: 0.2 μm, product name: "EPOSTAR® S", manufactured by NIPPON SHOKUBAI CO., LTD.). As a result, the abrasion depth was 1.7 μm, the peeled volume was 0.10 mm$^3$, and the appearance after testing was good. The evaluation results are shown in Table 1 below.

Example 6

The sliding member 2 for testing was produced and evaluated similarly to Example 1 except that in the composition for the first coating film layer, 63 parts by mass of polyamideimide resin was used, 25 parts by mass of polytetrafluoroethylene was used, and that 10 parts by mass of urethane resin beads: urethane cross-linked fine particles (average particle size: 6 μm, product name: "Art Pearl® C800", manufactured by Negami Chemical Industrial Co., Ltd) was used instead of 14 parts by mass of amino resin beads (melamine-formaldehyde condensation product, average particle size: 0.2 μm, product name: "EPOSTAR® S", manufactured by NIPPON SHOKUBAI CO., LTD.). As a result, the abrasion depth was 1.2 μm, the peeled volume was 0.14 mm$^3$, and the appearance after testing was good. The evaluation results are shown in Table 1 below.

Example 7

The sliding member 2 for testing was produced and evaluated similarly to Example 1 except that in the composition for the first coating film layer, 53 parts by mass of polyamideimide resin was used, 26 parts by mass of polytetrafluoroethylene was used, and that 14 parts by mass of amino resin beads (benzoguanamine-formaldehyde condensation product, average particle size: 5 μm, product name: "EPOSTAR® M05", manufactured by NIPPON SHOKUBAI CO., LTD.) and 5 parts by mass of urethane resin beads (urethane cross-linked fine particles, average particle size: 6 μm, product name: "Art Pearl® C800", manufactured by Negami Chemical Industrial Co., Ltd) were used instead of 14 parts by mass of amino resin beads (melamine-formaldehyde condensation product, average particle size: 0.2 μm, product name: "EPOSTAR® 5", manufactured by NIPPON SHOKUBAI CO., LTD.). As a result, the abrasion depth was 0.7 μm, the peeled volume was 0.01 mm$^3$, and the appearance after testing was good. The evaluation results are shown in Table 1 below.

Example 8

The sliding member 2 for testing was produced and evaluated similarly to Example 1 except that in the composition for the first coating film layer, 50 parts by mass of polyamideimide resin was used, 25 parts by mass of polytetrafluoroethylene was used, and that 13 parts by mass of amino resin beads (benzoguanamine-formaldehyde condensation product, average particle size: 5 μm, product name: "EPOSTAR® M05", manufactured by NIPPON SHOKUBAI CO., LTD.) and 10 parts by mass of urethane resin beads (urethane cross-linked fine particles, average particle size: 6 μm, product name: "Art Pearl® C800", manufactured by Negami Chemical Industrial Co., Ltd) were used instead of 14 parts by mass of amino resin beads (melamine-formaldehyde condensation product, average particle size: 0.2 μm, product name: "EPOSTAR® S", manufactured by NIPPON SHOKUBAI CO., LTD.). As a result, the abrasion depth was 1.1 μm, the peeled volume was 0.00 mm³, and the appearance after testing was good. The evaluation results are shown in Table 1 below.

Comparative Example 1

The sliding member 2 for testing was produced and evaluated similarly to Example 1 except that in the composition for the first coating film layer, 70 parts by mass of polyamideimide resin was used, and that 14 parts by mass of amino resin beads (melamine-formaldehyde condensation product, average particle size: 0.2 μm, product name: "EPOSTAR® S", manufactured by NIPPON SHOKUBAI CO., LTD.) was not used. As a result, the abrasion depth and peeled volume were not measurable, and the appearance after testing could not be evaluated. The evaluation results are shown in Table 1 below.

<Testing Method>

Evaluations were conducted by friction abrasion tests using Suzuki-type friction and abrasion testing machine (model: "EFM-III-EN", manufactured by ORIENTEC CORPORATION). As an opposite material, a pin having an outer diameter of 5 mm and height of 15 mm (material: iron (SUJ-2)) was used. This opposite material was polished so that the surface roughness is within a range of Rz[DIN] =1.0±0.5 μm.

Figure 3:
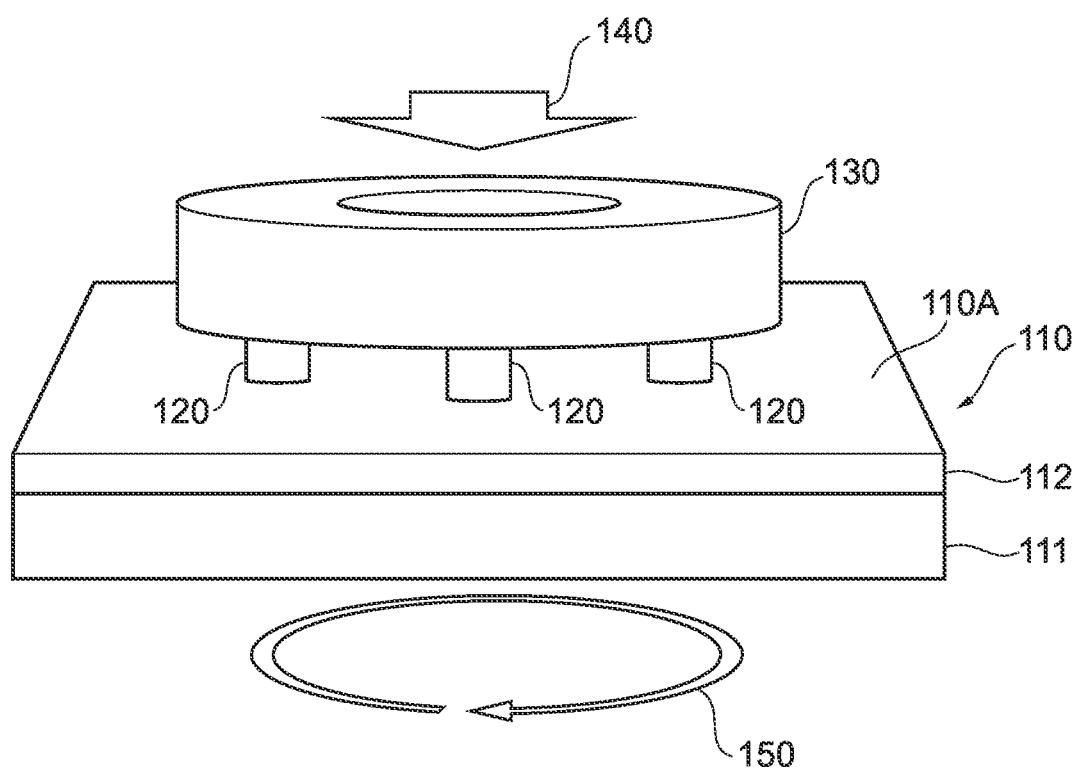
FIG. 3 An illustrative drawing of the friction abrasion test according to the example of the present disclosure.

FIG. 3 is an illustrative drawing of the friction abrasion test according to the present example. As shown in FIG. 3, in a friction abrasion test, the coat 112 side of disk 110 of the sliding member 2 for testing which had the coat 112 provided on substrate 111 (material: SUS430) was defined as sliding surface 110A. In a friction abrasion test, tool 130 having 3 pins 120 fixed thereon as opposite materials was placed on the coat 112, then the disk 110 was rotated at a peripheral speed of 100 rpm (0.17 m/s) for 50 hours (see arrow 150) while a load (see arrow 140) of 1000 N (surface pressure: about 17 MPa) was applied from above the tool 130. Abrasion level was evaluated based on the abrasion depth (μm) of the sliding surface 110A after testing. Peeling level was evaluated based on the peeled volume (mm³) of the area in which the coat 112 was peeled. Furthermore, appearance was evaluated based on appearance after testing which was checked visually for the sliding surface 110A after the friction abrasion test. Evaluation criteria were shown below.

<Evaluation of Abrasion Amount>
Abrasion depth of 1.5 μm or less: excellent
Abrasion depth of 2.5 μm or less: good
Abrasion depth of 2.5 μm or more, or unmeasurable: poor <Evaluation of Peeled Volume>
Peeled volume of 0.05 mm³ or less: excellent
Peeled volume of 0.15 mm³ or less: good
Peeled volume of 0.15 mm³ or more, or unmeasurable: poor <Appearance Evaluation>
Scratch mark was not seen after appearance evaluation: good
Scratch mark was seen after appearance evaluation, or appearance evaluation was impossible: poor <Comprehensive Evaluation>
Two or more "excellent" in the above 3 evaluations: excellent
No "poor" in the above 3 evaluations: good
One or more "poor" in the above 3 evaluations: poor

TABLE 1

| | | Example | | | | | | | | Comparative Example |
|---|---|---|---|---|---|---|---|---|---|---|
| | | 1 | 2 | 3 | 4 | 5 | 6 | 7 | 8 | 1 |
| Second coating film layer | PAI resin | | | | 50 | | | | | 50 |
| | PTFE | | | | 35 | | | | | 35 |
| | Graphite | | | | 15 | | | | | 15 |
| First coating film layer | PAI resin | 56 | 56 | 63 | 56 | 56 | 63 | 53 | 50 | 70 |
| | PTFE | 28 | 28 | 28 | 28 | 28 | 25 | 26 | 25 | 28 |
| | Graphite | 2 | 2 | 2 | 2 | 2 | 2 | 2 | 2 | 2 |
| | Resin beads A | 14 | | | | | | | | |
| | Resin beads B | | 14 | 7 | | | | | | |
| | Resin beads C | | | | 14 | | | | 14 | 13 | |
| | Resin beads D | | | | | 14 | | | | |
| | Resin beads E | | | | | | 10 | 5 | 10 | |
| Total | | 100 | 100 | 100 | 100 | 100 | 100 | 100 | 100 | 100 |
| Abrasion depth (μm) | | good (1.7) | good (2.0) | good (2.2) | excellent (1.3) | good (1.7) | excellent (1.2) | excellent (0.7) | excellent (1.1) | poor (—) |
| Peeled volume (mm³) | | excellent (0.04) | excellent (0.01) | excellent (0.02) | good (0.11) | good (0.10) | good (0.14) | excellent (0.01) | excellent (0.00) | poor (—) |
| Appearance after testing | | good | good | good | good | good | good | good | good | poor |
| Comprehensive evaluation | | good | good | good | good | good | good | excellent | excellent | poor |

The amount of each component to be added in the above Table 1 is as follows.

PAI resin: polyamideimide resin (product name: "HPC-5012", manufactured by Hitachi Chemical Company, Ltd.)

PTFE: polytetrafluoroethylene (product name: "Fluon® L173J", manufactured by AGC Inc.)

Graphite: graphite (product name: "HOP", manufactured by Nippon Graphite Industries, Co., Ltd.)

Resin beads A: melamine-formaldehyde condensation product (average particle size: 0.2 μm, product name: "EPOSTAR® S", manufactured by NIPPON SHOKUBAI CO., LTD.)

Resin beads B: benzoguanamine-melamine-formaldehyde condensation product (average particle size: 3 µm, product name: "EPOSTAR® M30", manufactured by NIPPON SHOKUBAI CO., LTD.)

Resin beads C: benzoguanamine-formaldehyde condensation product (average particle size: 5 µm, product name: "EPOSTAR® M05", manufactured by NIPPON SHOKUBAI CO., LTD.)

Resin beads D: benzoguanamine-formaldehyde condensation product (average particle size: 9 µm, product name: "EPOSTAR® L15", manufactured by NIPPON SHOKUBAI CO., LTD.)

Resin beads E: urethane cross-linked fine particles (average particle size: 6 µm, product name: "Art Pearl® C800", manufactured by Negami Chemical Industrial Co., Ltd)

As shown in Table 1, when the composition for the first coating film layer contains at least one type of resin beads selected from the group consisting of amino resin beads and urethane resin beads, it can be seen that every result of evaluation of abrasion amount, evaluation of peeled volume and appearance evaluation was good, and excellent abrasion resistance property and peeling resistance property could be obtained (Example 1 to Example 8). It is considered that these results were obtained because braking of the first coating film layer 12-1 at an interface of the first coating film layer 12-1 and the substrate 11 was suppressed by using at least one type of resin bead selected from the group consisting of amino resin beads and urethane resin beads, and peeling of the first coating film layer 12-1 from the substrate 111 could be suppressed. In particular, when the composition for the first coating film layer contains both amino resin beads and urethane resin beads, it can be seen that the results of abrasion evaluation and peeling evaluation were much more enhanced (Example 7 and Example 8).

On the other hand, when the composition for the first coating film layer did not contain amino resin beads or urethane resin beads as a solid lubricant, it can be seen that the coating film abraded and peeled before the predetermined testing time was reached and the results of evaluation of abrasion amount, evaluation of peeled volume and appearance evaluation were poor (unmeasurable) (Comparative Example 1). It is considered that these results were obtained because any of amino resin beads and urethane resin beads did not exist in the first coating film layer 12-1 and thus cleavage between the resin beads and the binder resin did not occur inside the first coating film layer 12-1 and cleavage at an interface between the first coating film layer 12-1 and substrate 111 progressed.

INDUSTRIAL APPLICABILITY

As described above, according to the above embodiment, a composition for a sliding member and a sliding member can be provided which can prevent a coating film from peeling off around an interface of the coating film and an object to be coated and which can maintain lubricating function over a long term, and in particular, such a sliding member can be suitably used for, for example, various compressors such as an air conditioner, an engine piston, parts for an internal-combustion engine, a sliding bearing, a chain, an electromagnetic valve for gas and liquid, a plunger, a valve.

As above, one embodiment of the present disclosure has been described, however, the embodiment of the present disclosure is not limited by details of the embodiment. Furthermore, elements which are easily conceived of by those skilled in the art, substantially identical elements and elements within a so-called range of equality are included in the above-mentioned constituting elements. Furthermore, the above-mentioned constituting elements can be appropriately used in combination with each other. In addition, various abbreviations, replacements or modifications can be made in constituting elements within the range not departing from the gist of the above-mentioned embodiment.

The invention claimed is:

1. A sliding member comprising:
a substrate,
a first coating film layer which is provided on the substrate, and
a second coating film layer which is provided on the first coating film layer, wherein
the first coating film layer comprises a coating film including a composition for a sliding member the composition containing:
a binder resin,
a solid lubricant, and
at least one type of resin beads selected from the group consisting of amino resin beads and urethane resin beads; and
the second coating film layer includes the binder resin and the solid lubricant, and does not include the resin beads.

2. The sliding member according to claim 1, wherein the resin beads include the amino resin beads and the urethane resin beads.

3. The sliding member according to claim 1, wherein the amino resin beads include at least one amino resin selected from the group consisting of a urea resin, a melamine resin, an aniline resin and a guanamine resin.

4. The sliding member according to claim 3, wherein the amino resin includes at least one condensation product selected from the group consisting of a benzoguanamine-formaldehyde condensation product, a benzoguanamine-melamine-formaldehyde condensation product and a melamine-formaldehyde condensation product.

5. The sliding member according to claim 1, wherein an average particle size of the resin beads is 0.1 µm to 20 µm.

6. The sliding member according to claim 1 wherein the amount of the resin beads to be added is 1 mass % to 35 mass % based on the total mass of the composition for a sliding member.

7. The sliding member according to claim 1, wherein the binder resin includes at least one resin selected from the group consisting of a polyamideimide resin, a polyamide resin, a polyimide resin, an epoxy resin and a phenol resin.

8. The sliding member according to claim 1, wherein the solid lubricant includes at least one lubricant selected from the group consisting of polytetrafluoroethylene, graphite and molybdenum disulfide.

\* \* \* \* \*